(12) United States Patent
Abu Elreich

(10) Patent No.: US 11,577,691 B2
(45) Date of Patent: Feb. 14, 2023

(54) METHOD FOR VEHICLE IDENTIFICATION AND COMMUNICATION BETWEEN TRANSPORTATION NETWORK COMPANY (TNC) SERVICE USERS

(71) Applicant: Ahmad Abu Elreich, Fresno, CA (US)

(72) Inventor: Ahmad Abu Elreich, Fresno, CA (US)

( * ) Notice: Subject to any disclaimer, the term of this patent is extended or adjusted under 35 U.S.C. 154(b) by 268 days.

(21) Appl. No.: 16/878,983

(22) Filed: May 20, 2020

(65) Prior Publication Data

US 2020/0369241 A1 Nov. 26, 2020

Related U.S. Application Data

(60) Provisional application No. 62/850,298, filed on May 20, 2019.

(51) Int. Cl.
| | |
|---|---|
| *B60R 25/24* | (2013.01) |
| *G06Q 50/30* | (2012.01) |
| *H04L 9/40* | (2022.01) |
| *G06F 16/245* | (2019.01) |
| *B60K 35/00* | (2006.01) |
| *H04W 4/90* | (2018.01) |
| *H04W 4/40* | (2018.01) |
| *B60R 25/102* | (2013.01) |
| G06Q 30/0241 | (2023.01) |
| G06Q 50/26 | (2012.01) |

(52) U.S. Cl.
CPC .............. *B60R 25/24* (2013.01); *B60K 35/00* (2013.01); *B60R 25/102* (2013.01); *G06F 16/245* (2019.01); *G06Q 50/30* (2013.01); *H04L 63/0853* (2013.01); *H04W 4/40* (2018.02); *H04W 4/90* (2018.02); *B60K 2370/152* (2019.05); *G06Q 30/0277* (2013.01); *G06Q 50/265* (2013.01)

(58) Field of Classification Search
CPC ......... H04W 4/90; H04W 12/06; H04W 4/40; H04W 4/80; G06F 16/245; G06Q 50/30; G06Q 50/265
USPC .......................................................... 701/13
See application file for complete search history.

(56) References Cited

U.S. PATENT DOCUMENTS

| | | |
|---|---|---|
| 2009/0083111 A1 | 3/2009 | Carr |
| 2011/0018719 A1 | 1/2011 | Huang |
| 2011/0145089 A1 | 6/2011 | Khunger |
| 2014/0026065 A1* | 1/2014 | Wang .................... G06F 3/0484 715/744 |
| 2015/0166009 A1 | 6/2015 | Outwater et al. |
| 2016/0012653 A1 | 1/2016 | Soroko |

(Continued)

*Primary Examiner* — Congvan Tran

(57) ABSTRACT

A method for effective vehicle identification and communication between riders of transportation network companies (TNC), and the vehicles that are being designated to the riders. Accordingly, a system used to execute the method of the present invention conveys the information of the rider on a display device on the designated vehicle of the rider, so as to notify the rider before getting into the designated vehicle. Additionally, the present invention also helps assist blind people by conveying audio messages, such as pipe messages or announcing their names. Further, the present invention provides riders the ability to send an emergency alert, thereby ensuring a safer ride. Furthermore, the present invention enables TNCs to utilize the display device as a trade dress and as an optional platform for other media advertisements.

9 Claims, 7 Drawing Sheets

(56) References Cited

U.S. PATENT DOCUMENTS

| | | |
|---|---|---|
| 2016/0140835 A1 | 5/2016 | Smith |
| 2016/0301698 A1 | 10/2016 | Katara |
| 2017/0127215 A1 | 5/2017 | Khan |
| 2017/0178269 A1 | 6/2017 | McKinnon et al. |
| 2017/0191842 A1* | 7/2017 | Magazinik ......... G01C 21/3438 |
| 2018/0211541 A1* | 7/2018 | Rakah .................... G08G 1/148 |
| 2019/0094589 A1 | 3/2019 | Zhu et al. |
| 2019/0232860 A1 | 8/2019 | Ferrone |
| 2020/0249042 A1* | 8/2020 | Warr ..................... H04W 4/023 |

* cited by examiner

METHOD FOR VEHICLE IDENTIFICATION AND COMMUNICATION BETWEEN TRANSPORTATION NETWORK COMPANY (TNC) SERVICE USERS

The current application claims a priority to the U.S. Provisional Patent application Ser. No. 62/850,298 filed on May 20, 2019.

FIELD OF THE INVENTION

The present invention relates generally to a method of vehicle identification for passengers utilizing transportation network company (TNC) or rideshare company vehicles. More specifically, the present invention relates to a method for vehicle identification and communication between a TNC vehicle rider and the vehicle that is being designated to the rider, wherein the method facilitates safety features and a trade dress for TNCs.

BACKGROUND OF THE INVENTION

A ridesharing company (also known as a transportation network company, ride-hailing service, or a mobility service provider) is a company that matches passengers with vehicles via websites and mobile apps. In present days, the increasing number of TNC vehicles have been a major cause for congestion and traffic in busy city roads, airports etc. This is because, riders on smart app ride match and TNCs get confused about their designated vehicles and it takes a long time to search the vehicle by color and number plate, leading to traffic congestion in busy areas like Airports, downtowns etc. Further, incidents such as passengers getting kidnapped as they get into the wrong vehicle, people pretending to be riders and getting into TNC vehicles etc., pose a threat to the life and belongings of both drivers and passengers. Thus, increased crime rates, safety issues, and time issues related to TNC vehicles are problems that need to be addressed. In other words, a reliable, and easy vehicle identification method for TNC vehicles is a need of the hour.

An objective of the present invention is to address these problems by providing an effective vehicle identification and communication method. It is an aim of the present invention to help TNC vehicle riders to find their vehicle/ride accurately and quickly. In order to accomplish that, the present invention, with the help of a system used to execute the method of the present invention, conveys the information of the rider through a display device mounted on the designated vehicle of the rider, so as to notify the rider before getting into the designated vehicle. Additionally, the present invention also helps assist blind people by conveying audio messages, such as pipe messages or announcing their names. Further, the method of the present invention employs a network platform that provides a clear point-to-point communications channel, wherein all communications between users of the method are identified and generated through the remote server. Additionally, the present invention provides riders the ability to send an emergency alert, thereby ensuring a safer ride. Furthermore, the present invention enables TNCs to utilize the display device as a trade dress and as an optional platform for other media advertisements.

DETAIL DESCRIPTIONS OF THE INVENTION

All illustrations of the drawings are for the purpose of describing selected versions of the present invention and are not intended to limit the scope of the present invention.

As can be seen in FIG. 1 through FIG. 7, the preferred embodiment of the present invention is a method for effective vehicle identification and communication between a TNC vehicle rider and a vehicle that is being designated to the rider. It is an aim of the present invention to help TNC vehicle riders to find their vehicle/ride accurately and quickly. In order to accomplish that, the present invention, with the help of a system used to execute the method of the present invention, conveys the information of the rider on a display device on the designated vehicle of the rider, so as to notify the rider before getting into the designated vehicle. Additionally, the present invention also helps assist blind people by conveying audio messages, such as pipe messages or announcing their names. Further, the method of the present invention employs a network platform that provides a clear point-to-point communications channel, wherein all communications between users of the method are identified and generated through the remote server. Additionally, the present invention provides riders the ability to send an emergency alert, thereby ensuring a safer ride. Furthermore, the present invention enables TNCs to utilize the display device as a trade dress and as an optional platform for other media advertisements.

Figure 1:
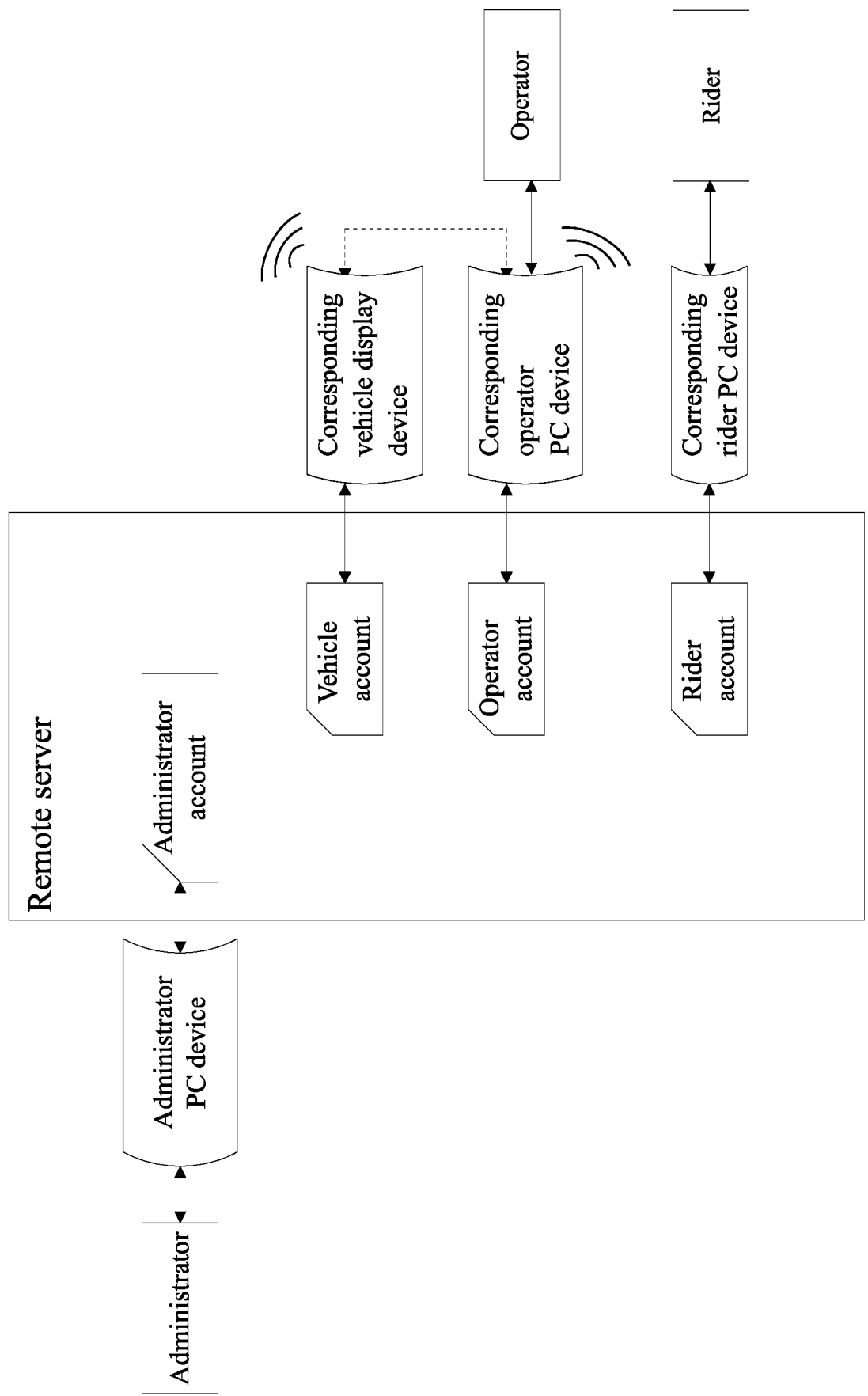
FIG. 1 is a block diagram illustrating the system overview of the present invention.

The following description is in reference to FIG. 1 through FIG. 7. As can be seen in FIG. 1, the system used to execute the method of the present invention allows the present invention to function as a communication tool between multiple users, and to enable a rider to identify their designated vehicle efficiently. To accomplish this, the method of the present invention associates each of the plurality of users with a unique user account that is managed by a remote server (Step A). The plurality of user accounts is divided into an administrator account, an operator account and a rider account. Each of the plurality of user accounts is associated with a corresponding user personal computing (PC) device. The corresponding user PC devices used to interact with the present invention can be, but is not limited to, a smart-phone, a laptop, a desktop, or a tablet PC. The remote server is used to facilitate communication between the plurality of user accounts. Moreover, the remote server is used to execute a number of internal processes for the present invention and is used to store message data. The system used to execute the method of the present invention further comprises a vehicle account managed by the remote server, wherein the vehicle account is associated to a vehicle identifier (ID), and the vehicle account is associated with a corresponding vehicle display device (Step B). The vehicle ID is associated with a unique IP (internet protocol) address, so that effective communication, identification and location of the vehicle display device is possible with the remote server. The operator operates the vehicle associated to the vehicle account and functions to take the designated vehicle to the rider. The operator may be a driver, or a self-driving robotic car. Further, each vehicle display device is wirelessly coupled to the operator PC device, such that the vehicle display device turns on when the operator PC device is turned on. The remote server communicates the rider information to the vehicle display device and the vehicle display device functions to notify the rider information to the rider. The administrator PC device functions to transmit information to the vehicle display device through the remote server, such that the vehicle display device may act as a trade dress for the administrator's company.

For example, if a rider requests for an Uber ride service and selects a vehicle (associated to a vehicle account) shown in the Uber app, the remote server functions to transmit the rider information from the rider account to the designated vehicle account that has been assigned to pick up the rider. Subsequently, the vehicle display device on the designated vehicle account functions to either display or voice the rider information. Further, the administrator account functions to transmit company information, such as Uber logo, authorization number of the designated vehicle etc. through the vehicle display device, which would further help the rider to find the assigned vehicle with ease, and get inside the vehicle with assurance.

Figure 2:
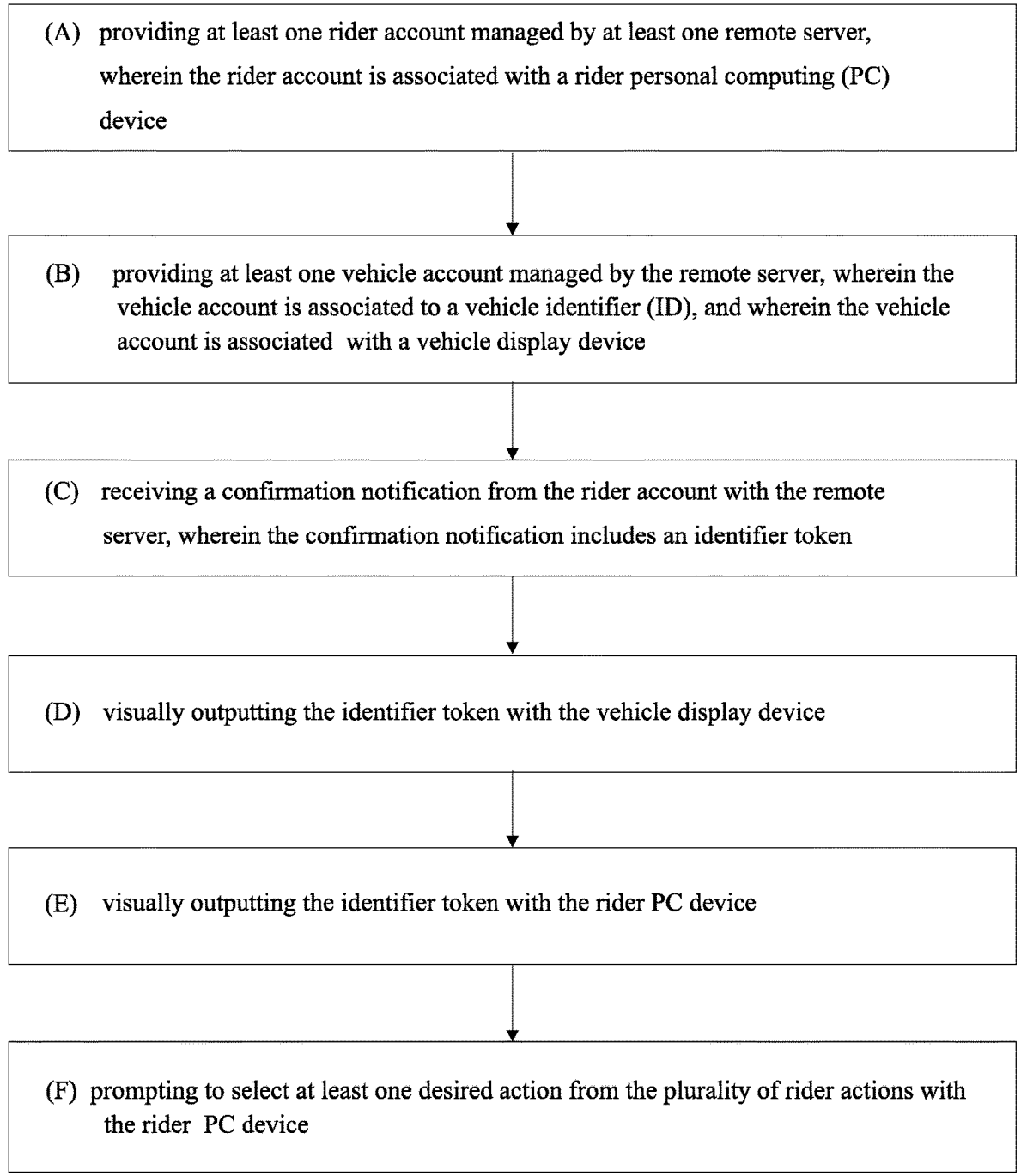
FIG. 2 is a flowchart describing the overall process followed by the method of the present invention.

As can be seen in FIG. 2, the overall method of the present invention accomplishes the above described functionalities by first receiving a confirmation notification from the rider account with the remote server, wherein the confirmation notification includes an identifier token (Step C). The confirmation notification triggers the transfer of communication between the different accounts via the remote server. The confirmation notification is a message that is sent to the remote server whenever the rider orders an app-based ride service. The method of the present invention further incorporates a unique identifier token into each confirmation notification with the remote server, thereby enabling the confirmation notification associated with each rider account to be unique.

As can be seen in FIG. 2, the overall method of the present invention continues by visually outputting the identifier token with the vehicle display device (Step D). The primary purpose of the present invention is to notify riders of their designated rides or vehicles before they get into the designated vehicles. Accordingly, the information entered by the rider through their corresponding rider PC device will be transmitted to the associated vehicle display device, via the remote server. The identifier token can include one or more information that is unique to the rider account. Displaying the riders name or an identifier number on the vehicle display device enable riders to find their vehicles, thereby helping traffic to move faster in areas such as Airports and busy streets.

As can be seen in FIG. 2, the overall method of the present invention continues by visually outputting the identifier token with the rider PC device (Step E). The identifier token is part of the confirmation notification and it contains unique information that the rider selected and entered via the rider PC device. Displaying the identifier token with the rider PC device enables the rider to check and compare if the same identifier token as seen in the rider PC is being displayed by the vehicle display device. Continuing with the example of the Uber rider from above, whenever the rider orders an Uber, the confirmation notification is sent to the remote server and it includes details entered by that rider through the associated rider PC device. Subsequently, as the designated Uber ride/vehicle approaches the Uber rider, the Uber rider is able to see the unique identifier token in their phone, as well check and see if the same identifier token being displayed on the vehicle display device of their designated Uber ride/vehicle. This enables the rider to identify and confirm their ride beforehand, and then enter into the car with assurance.

As can be seen in FIG. 2, the overall method of the present invention continues by prompting the rider to select at least one desired action from the plurality of rider actions with the rider PC device (Step F). According to the method of the present invention, the remote server prompts the rider to enter the rider information with the rider PC device. The rider can choose to enter any desired rider information that they wish to send to the vehicle account via the remote server, such as picture, number, name, logo etc. According to the method of the present invention, the remote server further prompts the rider to select a desired communication method with the rider PC device. The identifier token is transmitted to the vehicle display device via the desired communication method, wherein the desired communication method is at least one method selected from a group consisting of visual content, audio content and pipe messages. For example, the rider can choose to enter a logo (a picture), a number, a name, a code etc. as optional visual content, and/or select audio content or pipe messages of their choice, which would be of much assistance if the rider is blind or visually disabled. Thus, each confirmation notification would include a unique identifier token associated with each rider account, which makes it easier for the rider to identify their designated vehicle as the options they selected via the rider PC device is being displayed on the vehicle display device. According to the method of the present invention, once the rider gets into the designated vehicle and starts the ride, the identifier token may be removed from the vehicle display device.

Figure 3:
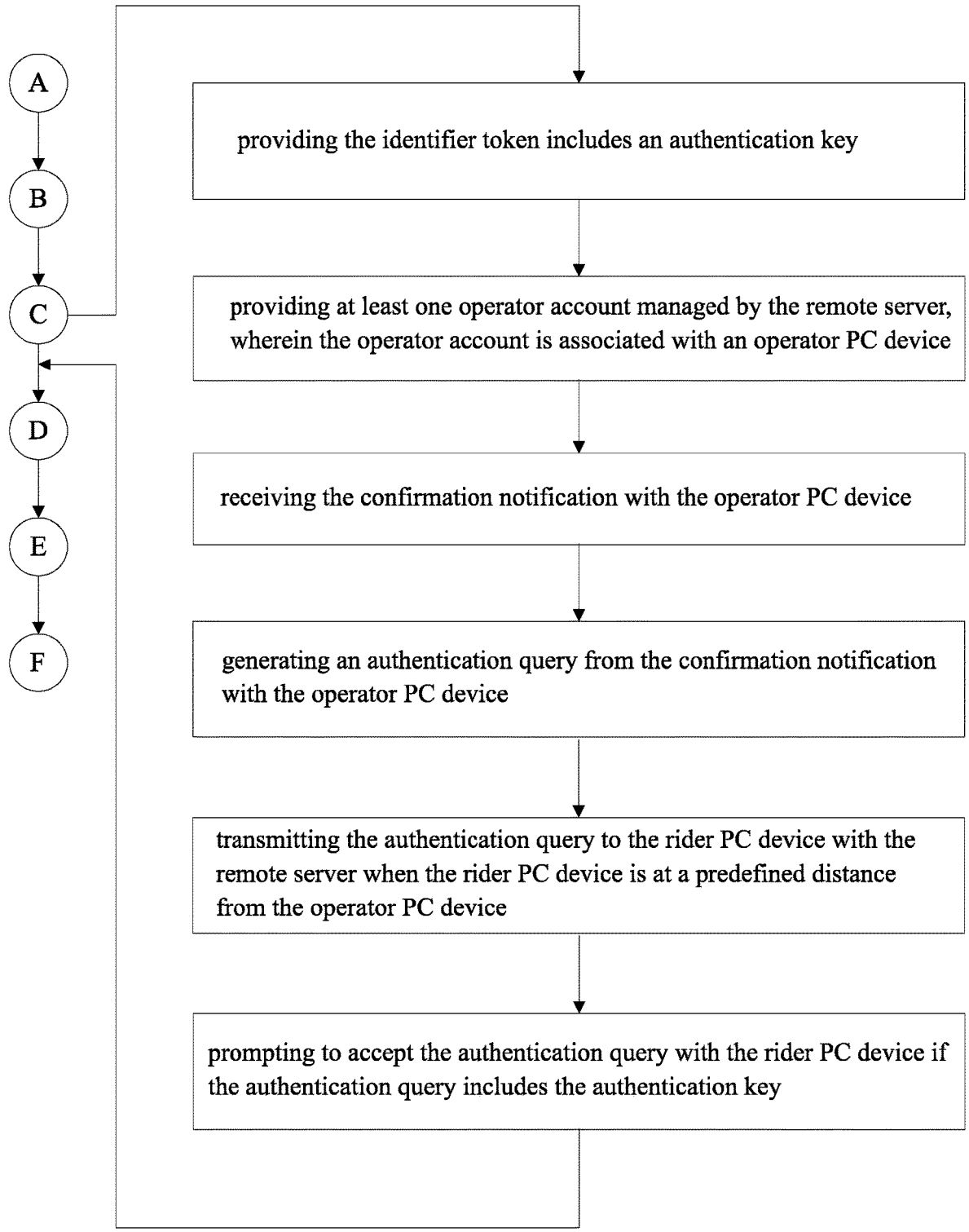
FIG. 3 is a flowchart describing a sub-process that describes the ability for the rider to confirm they have the correct driver through the method of the present invention.

As can be seen in FIG. 3, a sub-process of the method of the present invention enables the ability for the user to confirm they have the correct operator/driver. Besides safety to riders, the method of the present invention is also intended to provide safety to drivers, by ensuring that they don't pick wrong passengers. To that end, the sub-process begins by including an authentication key for each of the identifier token. The authentication key is a unique code generated for each ride. The sub-process continues by providing at least one operator account managed by the remote server, wherein the operator account is associated with an operator PC device. The operator is the person who operates the ride, (robot or driver), and each operator account is associated with an operator PC device such as a driver's phone or a robotic device. During the sub-process, when the confirmation notification is received with the operator PC device (via the remote server from the rider PC device), an authentication query is generated from the confirmation notification with the operator PC device for that particular confirmation notification. The authentication query is a question associated with that particular ride, which will be transmitted to the rider PC device with the remote server, only when the rider PC device is at a predefined distance from the operator PC device. In other words, as the driver gets closer to pick up the rider, the question or authentication query that has some information about the authentication key is sent to the rider PC device. As seen in FIG. 3, the sub-process continues by prompting the rider to accept the authentication query with the rider PC device if the authentication query includes the authentication key. Thus, the driver can ensure the rider is the right one if the rider accepts the authentication query, and the rider can also be assured that the query came from the right operator PC device since it includes the authentication key (which is the unique code that is part of the identifier token of a particular ride).

Continuing with the example of the Uber rider from above, the sub-process in FIG. 3 may be illustrated as follows. Each time the user requests an uber ride, an authentication key, (for example, let us assume 'ABC' is the authentication key) is created for that particular Uber ride. The driver needs the authentication key so the rider knows they are getting into the right uber. To that end, when the rider gets close to the driver, the remote server sends the authentication query to the rider. A query could be any simple question such as "select the right authentication key from a list of keys", or "enter your authentication key" etc. Once both the rider and the driver have the authentication key displayed in the rider PC device and the operator PC device respectively, they can show the authentication keys on their phones and confirm their identities. Thus, this optional sub-process provides additional security for both the rider and the driver just before beginning the ride.

Figure 4:
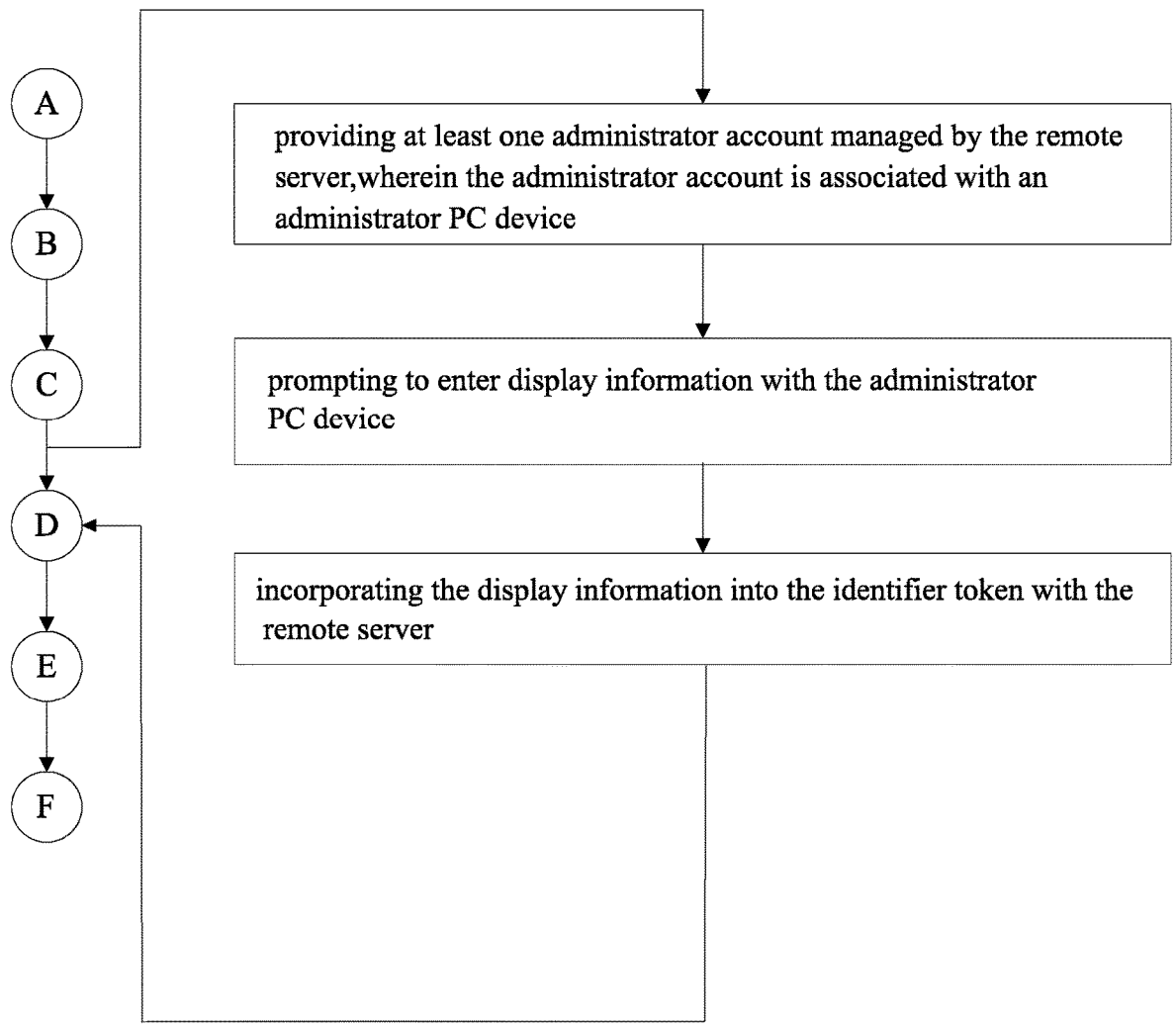
FIG. 4 is a flowchart describing a sub-process that enables an administrator to display information through the method of the present invention.

As can be seen in FIG. 4, a separate sub-process of the method of the present invention is designed to enable an administrator PC to display information through the method of the present invention. This sub-process begins by providing at least one administrator account managed by the remote server, wherein the administrator account is associated with an administrator PC device. The administrator PC device may be the TNC's or ride sharing company's PC device that is controlled by the administrator. The sub-process continues by prompting the administrator to enter display information with the administrator PC device. The control for the administrator to enter display information enables the administrator to select what information to display on one or more vehicle accounts associated to that administrator. Subsequently, the display information is incorporated into the identifier token with the remote server, so that the identifier token is displayed on the vehicle display device for the rider as well as general public to see. Further, the identifier token is customizable by the administrator, and the identifier token includes at least one detail selected from a group consisting of a logo, a designated vehicle authorization information, and an advertisement. In other words, the administrator selects or decides what to display on the vehicle display device, such as font type, size, etc. It could be a logo of the administrator's company (Uber, Lyft etc.), thereby enabling to use the vehicle display device as a trade dress. The administrator could also choose to reserve a spot to display the vehicle authorization number assigned by the administrator, the county, or any authoritative body to a particular vehicle account. Alternately, the administrator also has the optional authority to display advertisements of other companies or any other media on the vehicle display device after the rider begins the ride and the identifier token associated with the rider account is removed.

Figure 5:
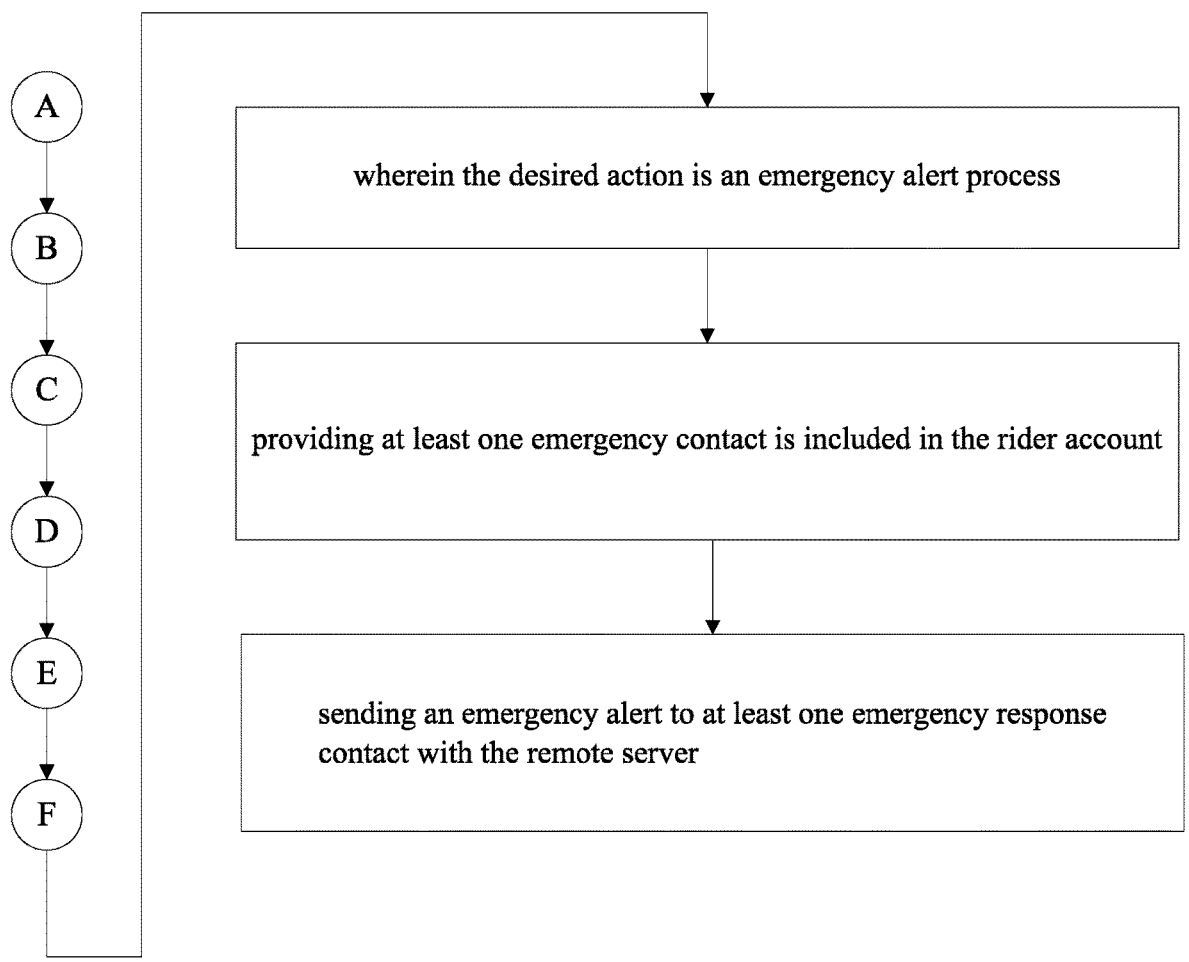
FIG. 5 is a flowchart describing a sub-process for enabling users to select an emergency alert through the method of the present invention.

As can be seen in FIG. 5, a dependent sub-process of the method of the present invention is designed to enable riders to use the present invention as an emergency alert. This sub-process begins by prompting the rider to select at least one desired action from the plurality of rider actions with the rider PC device, wherein the desired action is an emergency alert process. The sub-process continues by providing at least one emergency contact being included in the rider account. In other words, as part of the desired action that the rider selects, the rider can enter an emergency contact with the rider PC device.

Subsequently, in case of an emergency situation, the rider can send an emergency alert to the at least one emergency response contact through the remote server, with the press of a button on the rider PC device. The sub-process continues by displaying the emergency alert through the corresponding vehicle display device. As an alternate embodiment, the method of the present invention may be equipped with a sub-process that automatically contacts emergency response services if the rider selects the emergency alert process.

Figure 6:
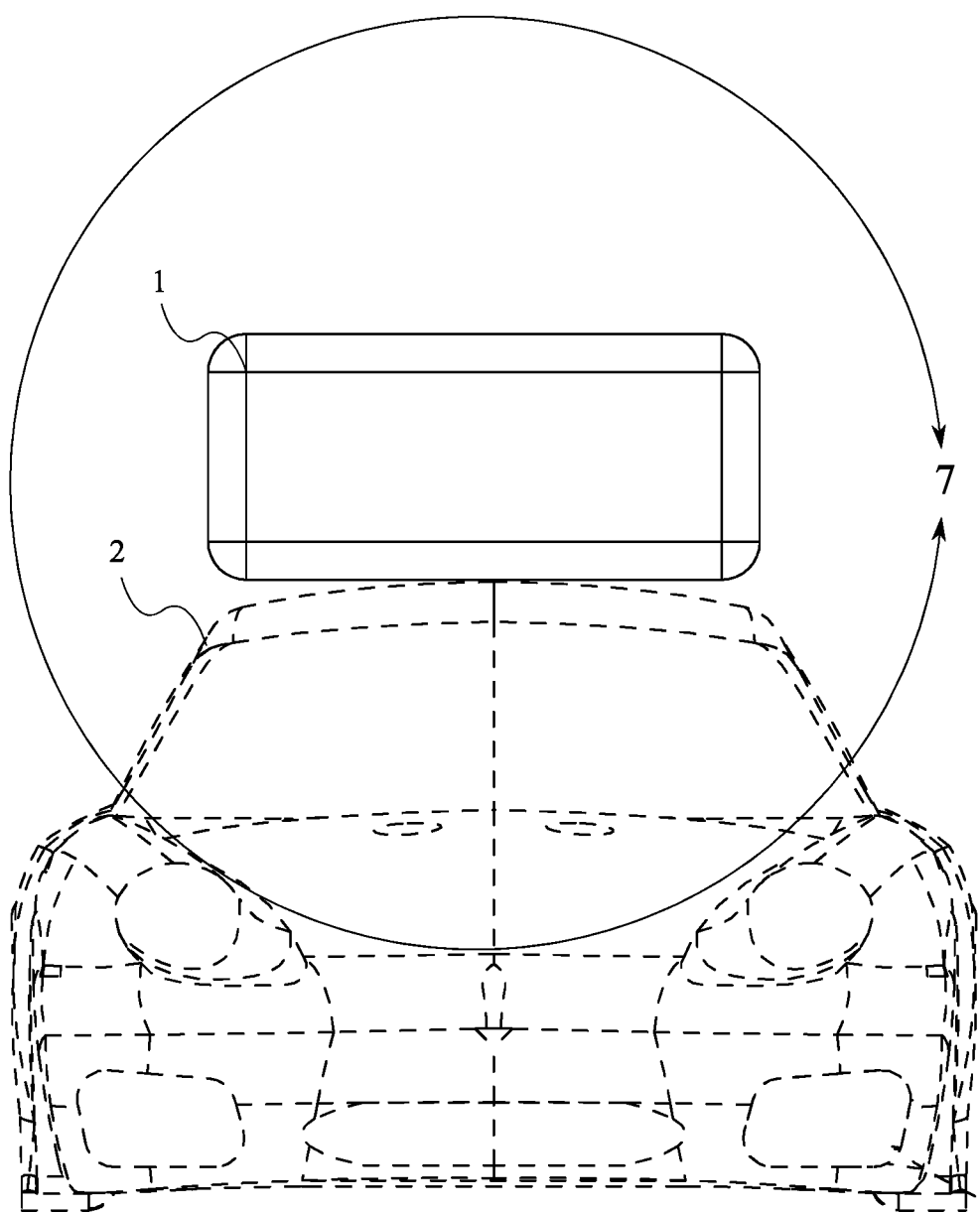
FIG. 6 illustrates a system of the present invention, wherein a display device mounted over a vehicle enables to communicate messages through the method of the present invention.
Figure 7:
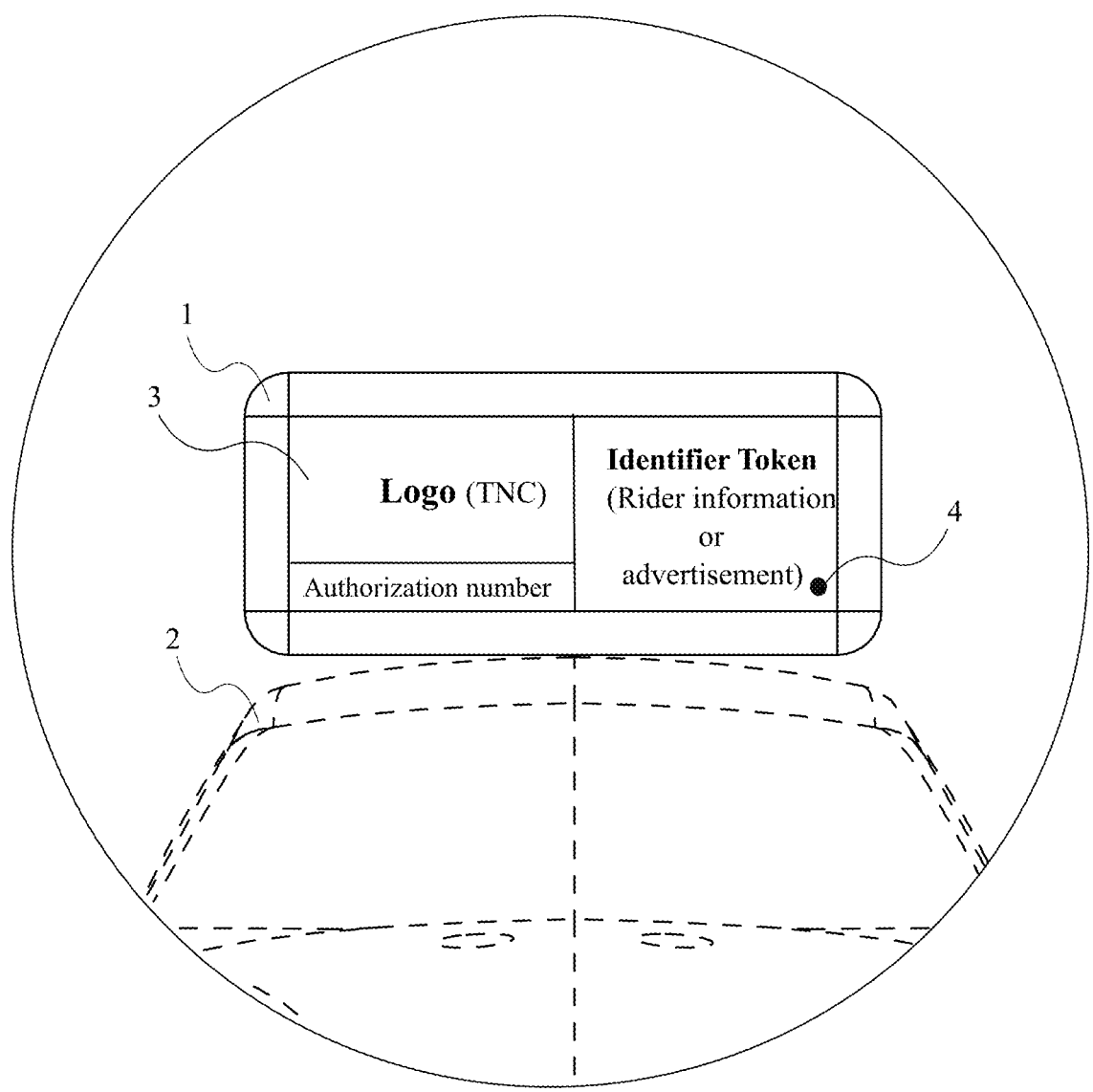
FIG. 7 is a detailed view of section 7 of FIG. 6, depicting a zoomed in view of the vehicle display device.

As can be seen in FIG. 6 and FIG. 7, the system equipped to execute the method of the present invention comprises the display device 1 mounted over a top surface of a vehicle 2. The display device 1 can be of any shape, size, material, orientation etc., as long as the objectives of the method of the present invention is not hindered. Further, the display device 1 may be positioned on different locations over the vehicle. Such locations include, but are not limited to, any position on the car roof of the car, the sides, the back, or the grills of the car, as long as the intended intentions of the present invention is not altered. Preferably the display device 1 is intended for visually outputting the identifier token on a display screen 3, wherein the display screen 3 is positioned on an anterior surface of the display device 1. Further, the system also enables to execute the method of outputting audio content and pipe messages through a speaker 4 mounted on the display device 1. Furthermore, the display device 1 may comprise a second display screen positioned opposite to the display screen 3, wherein the second display screen displays the same information as the display screen 3. This is so that the identifier token is visible to riders standing on both anterior and posterior locations respectively, of the designated vehicle. Preferably, the vehicle display device has a magnetic bottom surface, thereby enabling the vehicle display device 1 to be portable. However, any other method, that is known to one of ordinary skill in the art may be employed to mount the display device 1 to the vehicle 2.

The vehicle display device 1 is able to execute the method of the present invention with the help of a wireless communication system mounted within the display device 1, wherein the wireless communication device is communicably connected to the operator PC device and the remote server. Preferably the wireless communication method utilizes Bluetooth or z-waves. However, any other method that is known to one of ordinary skill in the art may be employed to communicate between the display device 1 and the operator PC device. For the smooth functioning of the system and execution of the method of the present invention, the vehicle display device 1 may further comprise a microcontroller and a power source that are mounted within a housing of the vehicle display device 1, wherein the microcontroller and the wireless communication system are electronically connected to the power source.

Although the invention has been explained in relation to its preferred embodiment, it is to be understood that many other possible modifications and variations can be made without departing from the spirit and scope of the invention as hereinafter claimed.

What is claimed is:

1. A vehicle identification method for riders, the method comprising:
   (A) providing at least one rider account managed by at least one remote server, wherein the rider account is associated with a rider personal computing (PC) device;
   (B) providing at least one vehicle account managed by the remote server, wherein the vehicle account is associated to a vehicle identifier (ID), and wherein the vehicle account is associated with a vehicle display device;
   (C) receiving a confirmation notification from the rider account by the remote server, wherein the confirmation notification includes an identifier token, wherein the identifier token includes an authentication key;
   (D) providing at least one operator account managed by the remote server, wherein the operator account is associated with an operator PC device;
   (E) receiving the confirmation notification by the operator PC device;
   (F) generating an authentication query based on the confirmation notification by the operator PC device;
   (G) transmitting the authentication query to the rider PC device from the remote server when the rider PC device is at a predefined distance from the operator PC device;
   (H) prompting to accept the authentication query by the rider PC device if the authentication query includes the authentication key;
   (I) visually outputting the identifier token on the vehicle display device;
   (J) visually outputting the identifier token on the rider PC device; and
   (K) prompting to select at least one desired action from a plurality of rider actions through the rider PC device.

2. The vehicle identification method of claim 1 comprising:
   prompting to select a desired communication method through the rider PC device; and
   transmitting information to the vehicle display device via the selected desired communication method.

3. The vehicle identification method of claim 2, wherein the desired communication method is at least one method selected from a group consisting of visual content, audio content and pipe messages.

4. The vehicle identification method of claim 1 comprising:
   prompting to enter rider information through the rider PC device; and
   incorporating the rider information into the confirmation notification by the remote server.

5. The vehicle identification method of claim 4, wherein the rider information is at least one information selected from a group consisting of picture, number, name, and logo.

6. The vehicle identification method of claim 1 comprising:
   providing at least one administrator account managed by the remote server, wherein the administrator account is associated with an administrator PC device;
   prompting to enter display information by the administrator PC device; and
   incorporating the entered display information into the identifier token with the remote server.

7. The vehicle identification method of claim 6, wherein the identifier token is customizable, and wherein the identifier token includes at least one detail selected from a group consisting of a logo, a designated vehicle registration information, and an advertisement.

8. The vehicle identification method of claim 1, wherein the desired action is an emergency alert process, wherein the emergency alert process comprising:
   providing at least one emergency contact included in the rider account; and
   sending an emergency alert to the at least one emergency contact by the remote server.

9. The vehicle identifying method of claim 1 comprising:
   visually outputting the identifier token on a display screen, the display screen being positioned on an anterior surface of the vehicle display device; and
   outputting audio content and pipe messages through a speaker mounted on the vehicle display device,
   wherein the vehicle display device is mounted over a surface of a vehicle associated with the vehicle account.

* * * * *